United States Patent [19]

Van Nocker et al.

[11] 4,200,185
[45] Apr. 29, 1980

[54] HARPOON TYPE CONVEYOR CONTROL SYSTEM

[75] Inventors: Melvin Van Nocker, Kalamazoo; Charles R. Larson, Bellevue, both of Mich.

[73] Assignee: Prab Conveyors, Inc., Kalamazoo, Mich.

[21] Appl. No.: 909,199

[22] Filed: May 25, 1978

[51] Int. Cl.² ............................................. B65G 25/00
[52] U.S. Cl. .................................. 198/718; 198/749; 198/856
[58] Field of Search ............... 198/751, 718, 749, 719, 198/856, 857; 91/451, 318, 38, 39

[56] References Cited

U.S. PATENT DOCUMENTS

| | | | |
|---|---|---|---|
| 2,550,723 | 5/1951 | Ross | 91/318 X |
| 3,701,414 | 10/1972 | Mayer et al. | 198/856 |
| 3,882,997 | 5/1975 | Dudley | 198/749 X |

*Primary Examiner*—Joseph E. Valenza
*Assistant Examiner*—Douglas D. Watts
*Attorney, Agent, or Firm*—Dressler, Goldsmith, Shore, Sutker & Milnamow, Ltd.

[57] ABSTRACT

In a reciprocating harpoon-type conveyor operated by a hydraulic circuit, a control system for the conveyor which includes pressure sensitive switches in the hydraulic circuit operated in response to increases in hydraulic pressure indicative of stoppage of the conveyor. The control system is responsive to operation of pressure switches to reverse the conveyor and to sense whether the conveyor is jammed, whether the jam is cleared, and if not, terminates operation of the conveyor.

12 Claims, 4 Drawing Figures

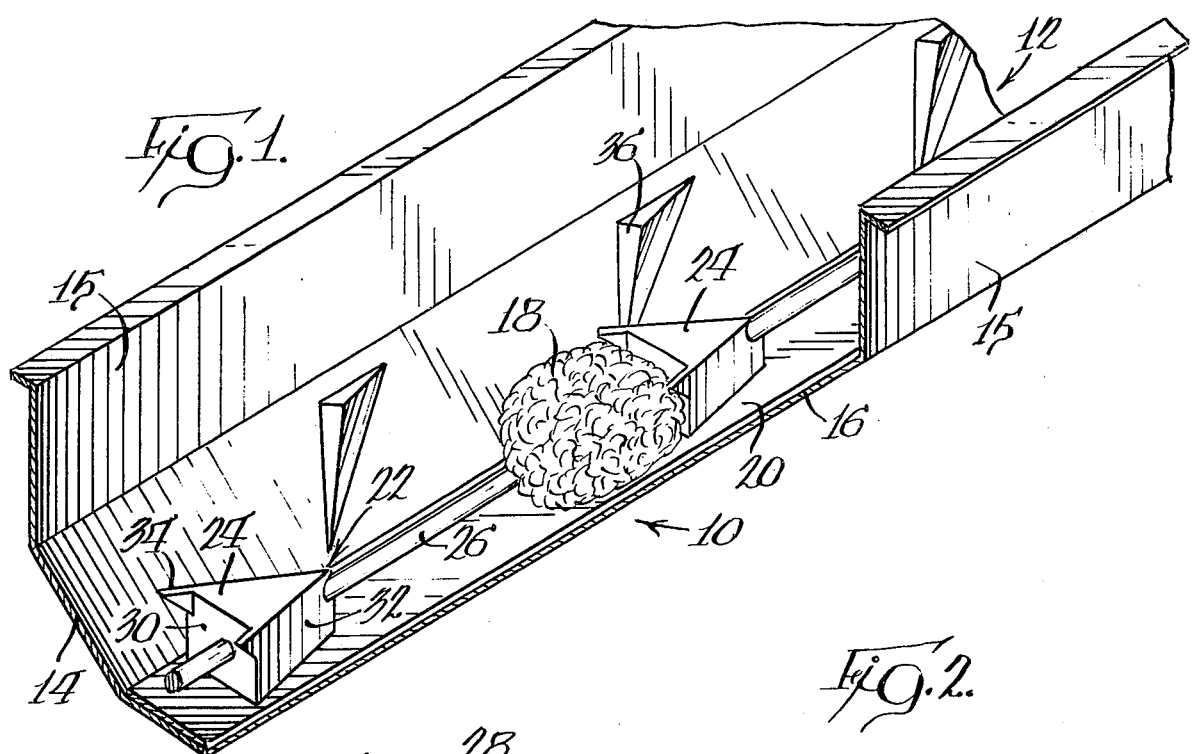
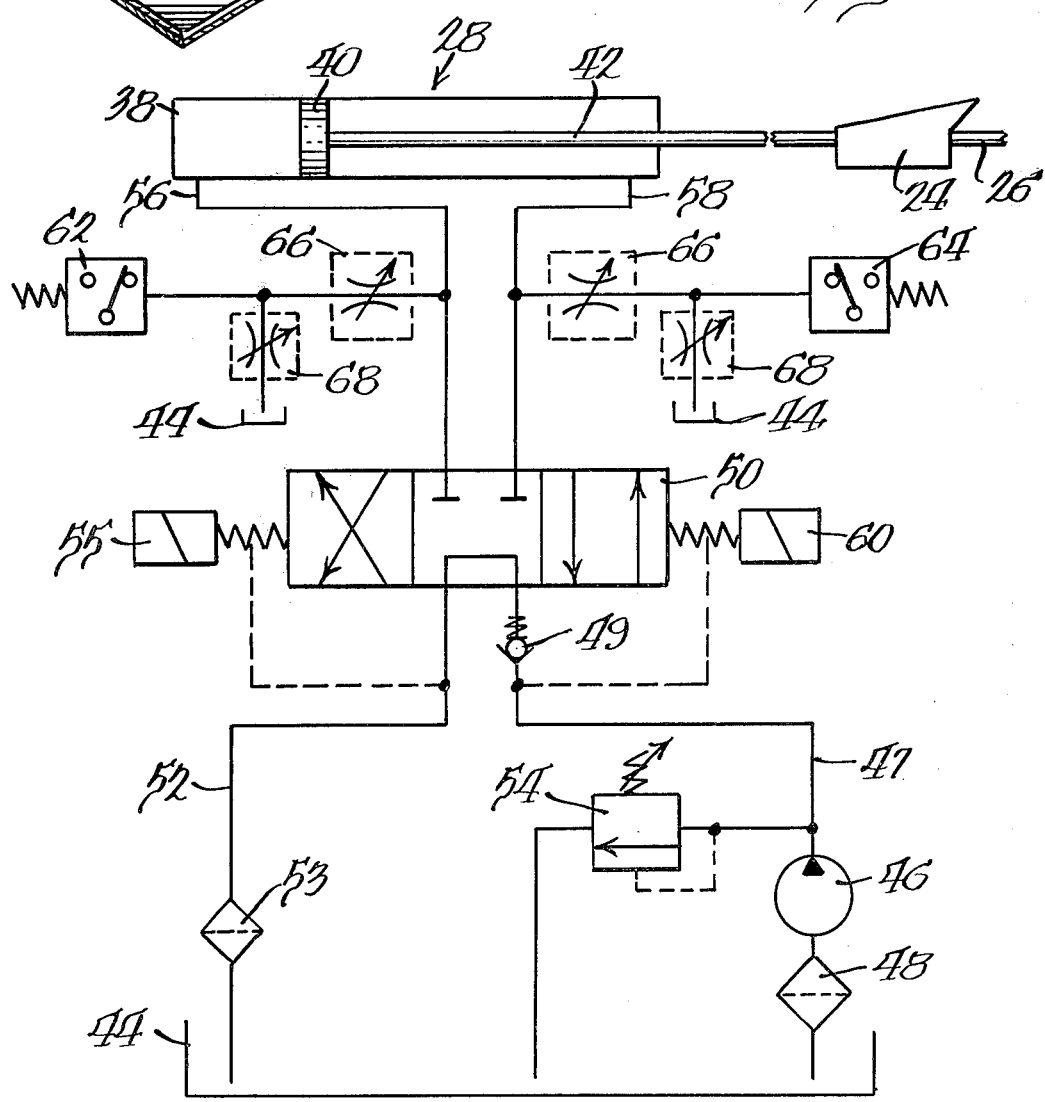

HARPOON TYPE CONVEYOR CONTROL SYSTEM

BACKGROUND OF THE INVENTION

This invention relates to conveyors, and more particularly to so-called harpoon-type conveyors suitable for transporting swarf-like materials.

A harpoon-type conveyor generally comprises one or more spaced, reciprocating drive members which usually comprise a plurality of pushing blades, or harpoon plows, normally arranged in a V-shaped, or similar configuration. The harpoon plows are attached to a conveyor rod or chain, which may be and preferably is mounted on a suitable guide member situated in a conveyor trough.

In any event, the harpoon plows are located in the trough and are adapted for reciprocating movement within the trough. Projecting members or barbs are secured to the inside surfaces of the conveyor trough and function to engage and retain the material being conveyed in the conveyor trough as the pushing blade or harpoon plow is shifted from a forward position to a rearward position during a return stroke.

These conveyors are able to handle various types of swarf-like material, e.g., metal chips, from long and stringy to fine, with or without cutting fluids that may be present. Typical conveyors of this general type are illustrated in U.S. Pat. Nos. 3,112,025, 3,175,677, 3,158,257, 3,542,187, 3,659,702, 3,799,329, and 3,882,997; copending Van Nocker U.S. application Ser. No. 716,428, filed Aug. 23, 1976, now U.S. Pat. No. 4,082,178; and German Pat. No. 1,139,068.

Conveyors of this general type are well suited for transporting metal or plastic chips or swarf generally produced during manufacturing processes with machine tools such as lathes, milling machines, drills, gear hobbers, boring mills and the like. On occasion, a conveyor may become jammed. For example, pieces may wedge between the reciprocating harpoon plows and the barbs. In such instances, the conveyor must be stopped and the jam cleared. It is important that when jams do occur that they be sensed promptly and, if possible, that automatic clearing be attempted; and if not possible, the system operation terminated in order to avoid damage to the conveyor and/or the drive system therefor.

SUMMARY OF THE INVENTION

In accordance with the present invention there is provided a control circuit for the drive system for a harpoon-type conveyor which provides automatic reciprocating operation of the harpoon conveyor means, which senses the occurrence of jams, which automatically operates the harpoon in an attempt to clear the jam and, if that is not possible, automatically terminates operation of the conveyor and provides a signal indicative of the malfunction.

Thus, in accordance with the present invention, a reciprocating harpoon-type conveyor is reciprocably operated by utilizing a fluid motor such as a hydraulic piston and cylinder arrangement connected to the harpoon assembly. The fluid motor or hydraulic piston is operated by a pressurized fluid or hydraulic circuit in which is located control valve means operable to couple pressurized fluid to either side of the piston to achieve the reciprocating movement thereof. A control system for the fluid circuit is utilized to appropriately energize solenoids to operate the control valve and is also responsive to increases in hydraulic pressure in the fluid circuit for reversing the operation of the hydraulic motor. If such pressure changes occur prior to the time when they would normally occur at the end of a stroke, the control system detects the fact that a jam has occurred and whether the jam is cleared, and if the jam is not cleared terminates system operation and generates an alarm.

More specifically, the control system for the hydraulic power circuit operating the reciprocable harpoon conveyor includes pressure switch means disposed in the fluid or hydraulic circuit in both the forward and reverse pressure lines thereof. The pressure switch means are operated in response to increases in pressure in the hydraulic circuit beyond a preselected level.

When the pressure switches are operated, the control system effects operation of the control valve means to reverse the movement of the harpoon conveyor. This increase in pressure will normally occur at the end of both the forward and reverse strokes. When the pressure rise occurs, the control circuit operates the hydraulic valve to continuously effect a reciprocating movement of the conveyor.

If a jam occurs and the harpoon conveyor cannot be moved, the pressure increase sensed by the pressure switches will have occurred before expiration of the time period required to complete either the forward or reverse stroke of the harpoon conveyor. In this event, a malfunction signal is produced and if that malfunction signal is not terminated within a preselected time interval the operation of the hydraulic motor is terminated and an alarm signal generated.

Thus, in accordance with the present invention, the control circuit of the present invention provides for a reliable system for effecting the desired reciprocating action of the harpoon conveyor and also provides a reliable means for sensing jams, for attempting to clear the jams and for deactuating the system and providing an indication thereof if the jam cannot be cleared automatically.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

FIG. 1 is a fragmentary perspective view of a harpoon-type conveyor with which the control system of the present invention is used, the conveyor being partially broken away to show interior detail;

FIG. 2 is a schematic drawing of a hydraulic circuit for operating the harpoon-type conveyor.

Description of Preferred Embodiment

Figure 3A:
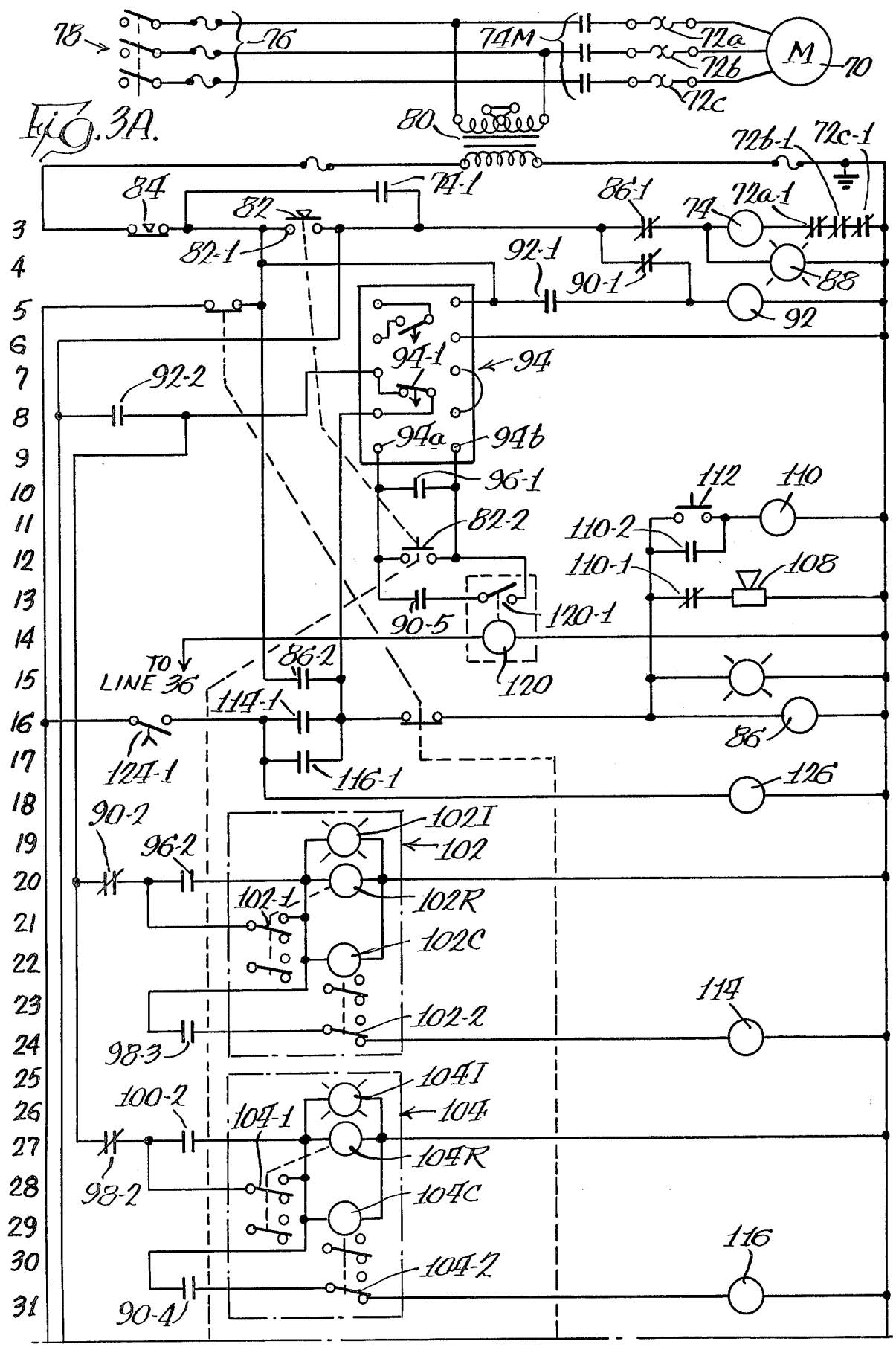
FIGS. 3A and 3B are schematic diagrams of the electronic control system embodying the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring to FIG. 1, the harpoon conveyor 10 comprises a conveyor trough 12 having upstanding wall means which includes slanting walls 14 and contiguous vertical walls 15 on either side of the trough bottom wall 16. The conveyor 10 contains swarf-like material 18 as illustrated, which can be cuttings, chips, and/or turnings resulting from the machining of materials such as metal, plastic, wood and the like. A bearing member 20 is provided on the bottom wall for supporting and accommodating the sliding reciprocating movement of a harpoon means 22. The harpoon means 22 consists of a plurality of spaced harpoon plows 24 mounted and affixed to a conveyor rod 26. The conveyor rod 26 and the harpoon plows 24 attached thereto are reciprocably driven by a reciprocating drive means 28 (described below) attached to one end thereof for pushing the swarf-like material 18 forwardly along the conveyor trough 12.

The harpoon plows 24 each have a front push surface 30 and slanted, converging V-shaped blades 32 which form a wedge for penetrating through the swarf-like material 18 when the harpoon means 22 is moved rearwardly or retracted. The blades 32 terminate on the downstream, or forward end of the harpoon plow 24 in sharp pointed prongs 34. This construction allows relatively small fines of chip material or swarf to be pushed forward by the surface 30 while larger stringy material such as plastic cuttings or turnings are typically engaged by the prongs 34 and also moved along in the forward direction.

When the harpoon plows 24 are retracted or moved in the rearward direction, the converging V-shaped blades 32 tend to pass through the swarf-like material 18 to inhibit the harpoon plows 24 from dragging the swarf-like material 18 rearwardly during the return stroke of the reciprocating harpoon means 22. Barbs 36 are provided on the inside surface of the upstanding slanted wall means 14 of the trough 12. The barbs 36 are typically located on the wall means 14 on opposite sides of the trough 12 and adjacent to the harpoon means 22. Pairs of opposed barbs 36 may lie directly across the trough from each other or opposed barbs may be staggered or offset relative to each other.

Turning to FIG. 2, there is shown one suitable fluid circuit for reciprocably operating the harpoon assembly or harpoon means 22. The drive circuit is a fluid drive circuit which includes a fluid motor 28 such as hydraulic cylinder 38 having a piston 40 reciprocably movable therein and a piston rod 42 attached to the piston 40 extending from one end of the cylinder 38. The other end of the piston rod 42 is attached to the rear end of the harpoon assembly conveyor rod 26 so that reciprocable movement of the piston rod 42 effects reciprocation of the harpoon assembly 22.

The fluid circuit for operating the hydraulic cylinder includes a reservoir 44. An electrically operated hydraulic pump 46 disposed in the hydraulic supply line or conduit 47 pumps hydraulic fluid from the reservoir through a suitable filter 48 and a check valve 49 to a solenoid operated control valve 50. In the position shown, the control valve 50 is closed and the fluid under pressure returns to the reservoir 44 through a drain line or conduit 52 and filter 53. A relief valve 54 is provided between the conduit 47 and the reservoir 44.

The control valve 50 is a two way solenoid operated valve which is operable by the forward solenoid 55 to connect the fluid under pressure in the supply line 47 to the head end of the hydraulic cylinder 38 through head conduit 56 and the rod end of the cylinder 38 to the drain line 52 through rod conduit 58. When so operated, the pressurized fluid in the supply line 47 causes the piston 40 to extend piston rod 42 thereby advancing the harpoon assembly 22 in the forward direction. When the reverse solenoid 60 is operated, the control valve 50 connects the supply line 47 to the rod end of cylinder 38 through rod line 58 and the head end to the reservoir 44 through head line 56 and drain line 52. The piston rod 42 is thus retracted into the cylinder 34 thereby withdrawing or retracting the harpoon assembly 22 in the rearward direction.

A pair of pressure sensitive switches 62, 64 are connected to conduits 56, 58, respectively, through pressure reduction or needle valves 66. The switches 62, 64 are operated in response to an increase in pressure in the lines 56, 58 to which they are connected above a selected level to provide control functions described below with respect to the control system shown in FIG. 3. Bypass valves 68 are provided to accommodate increases in pressure beyond the levels required to operate the pressure switches 62, 64.

When movement of the piston 40 in either direction is inhibited, either because the piston has reached the end of its stroke or because the harpoon assembly 22 becomes jammed and cannot be advanced or retracted, the pressure increases in the appropriate line whether it be head line 56 for forward movement or rod line 58 during retraction, depending upon which of the solenoids 54, 60 has been actuated. When the pressure reaches a selected value, the corresponding pressure switch 62 or 64 connected to that line operates. The control system shown in FIGS. 3A and 3B responds to operation of the pressure switches 62, 64 as described below.

Figure 3B:
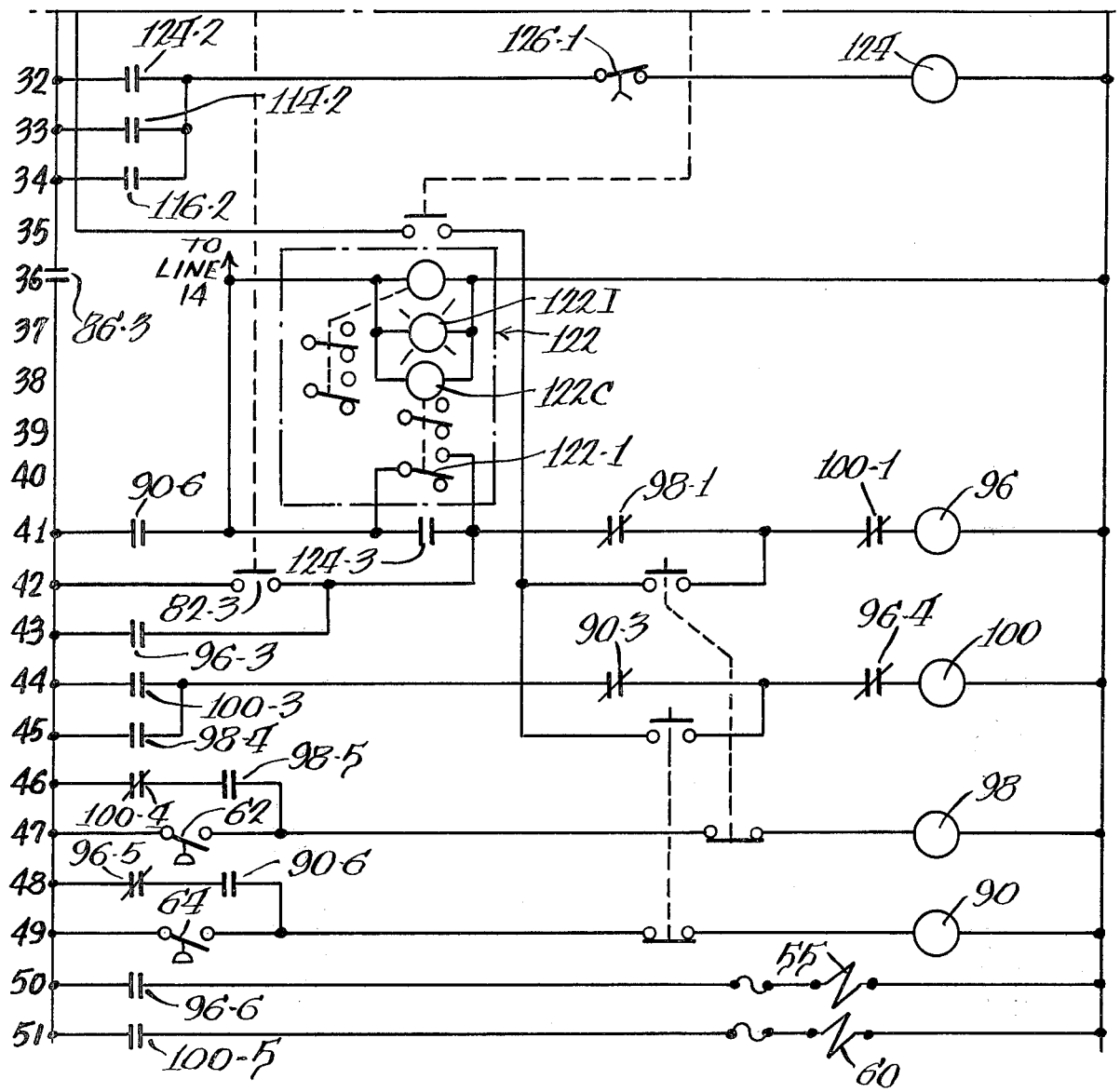

The circuit embodying the control system is shown in FIGS. 3A and 3B. A three phase hydraulic pump motor 70 is connected to a three phase source (not shown) through overload sensors 72a, 72b, 72c, main contactor contacts 74-M, fuses 76 and a main disconnect switch 78. The power source typically is a 460 volt, three phase 60 hz, source. A single phase transformer 80 is connected across two of the power lines between the disconnect switch 78 and the contactor contacts 74-M. The secondary of the transformer 80 provides 115 volt single phase power for the control system.

Operation of the control system is initiated by actuating a manual start push button 82 having three sets of normally open contacts. Closure of the first contacts 82-1 (line 3) completes a circuit through the normally closed contacts of the stop/reset switch 84, the normally closed contacts 86-1 (line 3) of an alarm relay 86 (line 16) to energize the main contactor coil 74 through the normally closed contacts 72a-1, 72b-1, 72c-1 of the overload sensors 72a, 72b, 72c, and to energize a system on indicator 88.

Closure of the start switch contacts 82-1 also completes a circuit through the normally closed contacts 90-1 (line 4) of a maximum reverse stroke relay 90 (line 49) to energize an alarm delay relay 92 (line 5).

The second contacts 82-2 (line 12) of the start switch close to short out and reset the motion detector timer relay 94 (lines 5–9) to reset and initiate the operation of that relay. The third contacts 82-3 (line 42) of the start switch close to energize forward control relay 96 (line 41) through the normally closed contacts 98-1 (line 41)

of the maximum forward stroke relay 98 (line 47) and the normally closed contacts 100-1 (line 41) of the reverse control relay 100 (line 44).

When the contactor coil 74 is energized, the contactor contacts 74-M in the power lines are closed to energize the hydraulic pump motor 70. In addition the contactor control contact 74-1 (line 2), connected across the first contacts 82-1 of the start switch 82 are closed to bypass the start switch thus allowing the start switch to be released and to return to its open position without deenergizing the control system.

The alarm delay relay 92 (line 5) when energized, closes normally open holding contacts 92-1 (line 5) and normally open enabling contacts 92-2 (line 8). The holding contacts 92-1 complete a circuit through the stop/reset switch 84 to maintain the alarm delay relay 92 energized until and unless the stop/reset button is actuated to deenergize the control system. The enabling contacts 92-2 enable the alarm relay 86 (line 16) which is not energized because the closure of the second start switch contacts 82-2 (line 12) has reset the motion detector 94 to open the normally closed contacts 94-1 (line 8) of the motion detector. Closure of the normally open alarm delay relay contacts 92-2 (line 8) also completes circuits to the forward stroke timer 102 (lines 19–24) through the normally closed contacts 90-2 (line 20) of the maximum reverse stroke control relay 90 (line 49), and to the reverse stroke timer 104 (lines 26–31) through the normally closed contacts 98-2 (line 27) of the maximum forward stroke relay 98 (line 47).

The forward control relay 96 (line 47) energized by closure of the third start contacts 82-3 (line 42) operates to initiate the forward run cycle of the system to advance the harpoon assembly 22. When the forward control relay 96 is energized, normally open contacts 96-1 (line 10) are closed to reset and pulse the motion timer 94. Each time the control contacts 94a, 94b of the motion timer 94 are shorted, the timer is reset. When this occurs, the normally closed contacts 94-1 (line 8) of the motion detector are opened and remain open until and unless the motion timer times out.

If this occurs, a circuit is completed to the alarm relay 86 (line 16) to an alarm indicator 106 (line 15), a horn 108 through the normally closed contacts 110-1 of a horn relay 110 (line 11). The horn 108 may be deenergized by closing a horn acknowledge switch 112 to energize the horn relay 110, thus opening the normally closed contacts 110-1 and closing normally open bypass contacts 110-2 to maintain the horn relay 110 energized after release of the acknowledge button 112.

The second normally open contacts 96-2 (line 20) of the forward control relay 96 (line 41) are closed to energize the forward stroke timer 102 as well as the forward stroke indicator 102I (line 19). When energized, the timer control relay 102R closes the normally open contacts 102-1 (line 21) to complete a circuit to the forward jam relay 114 through the normally closed contacts 102-2 of the forward stroke timer 102 and the normally open contacts 98-3 (line 24) of the maximum forward stroke relay 98 (line 47). The timed normally closed contacts 102-2 of the forward stroke timer 102 are operated by timer clock 102C to open a selected time period after the timer 102 is energized, which time period is somewhat less than the time normally expected for the harpoon assembly 22 to complete its forward stroke. If the maximum forward stroke relay 98 is energized before the forward stroke timer clock 102C times out, the forward jam relay 114 (line 24) will be energized (as described below).

Energization of the forward control relay 96 (line 41) also closes the normally open holding contacts 96-3 (line 43) to bypass the start switch contacts 82-3 so that the forward control relay 96 remains energized after release of the start push button 82. The energized forward control relay 96 opens normally closed forward relay contacts 96-4 (line 44) in series with the reverse control relay 100 to preclude simultaneously energizing the reverse control relay 100. In addition, normally closed forward relay contacts 96-5 (line 48) are opened to preclude energizing of the maximum reverse stroke relay 90 (line 49).

Finally, the normally open control contacts 96-6 (line 50) of the forward control relay 96 connected in series with the forward solenoid 55 are closed to energize solenoid 55 and operate the control valve 50 to connect the supply line 47 to head conduit 56 and the head end of cylinder 38. This results in operation of the hydraulic motor 28 to advance the harpoon assembly 22 in the forward direction.

In the normal operation, i.e., if no jams occur, the forward stroke timer 102 (lines 19–24) times out and the normally closed delay contacts 102-2 (line 24) open to disable and prevent energization of the forward jam relay 114. At the end of the stroke, when the harpoon assembly is completely advanced, the piston 40 is precluded from further movement, and, therefore, pressure in conduit 56 rises. When this pressure reaches a selected value, forward pressure switch 62 (line 47) is closed to energize the maximum forward stroke relay 98.

When the maximum forward stroke relay 98 is energized, normally open contacts 98-3 (line 24) are closed. However, since the forward stroke timer 102 has timed out, and its timed normally closed contacts 102-2 are open, the forward jam relay 114 is not energized. In addition, normally closed contacts 98-2 (line 27) of the maximum forward stroke relay 98 are opened to disable the reverse stroke timer 104. Normally open contacts 98-1 (line 41) are opened to deenergize the forward control relay 96. A fourth set of normally open contacts 98-4 (line 45) are closed to enable the reverse control relay 100 through the normally closed contacts 90-3 of the maximum reverse stroke relay 90 and the normally closed contacts 96-4 of the forward control relay 96 which now closed has a result of the forward control relay being deenergized. A fifth set of normally open contacts 98-5 (line 46) are closed to maintain the maximum forward stroke relay 98 energized even if the pressure switch 62 opens.

When the forward control relay 96 (line 41) is deenergized as a result of the normally closed contacts 98-1 of the forward stroke relay 98 opening, normally open contacts 96-1 (line 10) across the motion detector control terminals 94a, 94b open to allow the motion detector 94 to begin to time out. The normally open contacts 96-2 (line 20) in series with the forward stroke timer 102 open.

The forward control relay holding contacts 96-3 (line 43) are opened to maintain the forward control relay 96 deenergized. The normally closed contacts 96-4 (line 44) in series with the reverse control relay 100 close allowing the reverse control relay to be energized through the normally closed contacts 90-3 of the reverse maximum stroke relay 90 and the now closed contacts 98-4 of the maximum forward stroke relay 98.

The normally closed contacts 96-5 (line 48) open to disable the bypass circuit across the reverse pressure switch 64 thereby precluding energizing of the maximum reverse stroke relay 90 unless and until the pressure switch 64 is closed. Finally, the normally open contacts 96-6 (line 50) in series with the forward solenoid 54 are opened to deenergize that solenoid.

When the reverse control relay 100 (line 44) is energized, the reverse stroke cycle is initiated. The normally open contacts 100-2 (line 27) of the reverse control relay 100 close to enable the reverse stroke timer 104 (lines 26–31) which is not energized because the normally closed contacts 98-2 of the maximum forward stroke relay are still open. The normally closed contacts 100-1 (line 41) of the reverse control relay open to disable the forward control relay 96 and preclude simultaneous energizing of that relay.

The normally open holding contacts 100-3 (line 44) of the reverse control relay 100 close to maintain that relay energized even when the forward stroke relay 98 is deenergized to open the contacts 98-4 (line 45). The normally closed contacts 100-4 (line 46) open to disable the forward pressure switch bypass circuit so that the maximum forward stroke relay 98 is deenergized when the forward pressure switch 62 opens. The normally open contacts 100-5 (line 51) close to energize the reverse solenoid 60 thus initiating the reverse or retraction stroke of the hydraulic motor 28 to retract the harpoon assembly 22.

When the reverse solenoid 60 is energized, line 56 is connected to the drain conduit 52 and the pressure in line 56 drops allowing the forward pressure switch 62 to open. When the pressure switch 62 opens, maximum forward stroke relay 98 (line 47) is deenergized. As a result, the normally open contacts 98-3 (line 24) in series with the forward jam relay 114 open thereby disabling that relay. The normally closed contacts 98-2 (line 27) close to energize the reverse stroke timer 104 through the now closed contacts 100-2 of the reverse control relay 100.

When the reverse stroke timer is energized, reverse indicator 104I is turned on and reverse timer control relay 104R is energized to close the normally open contacts 104-1 (line 28) to enable the circuit to the reverse jam relay 116 (line 31) through the normally closed contacts 104-2 (line 31) of the reverse stroke timer 104 and the normally open contacts 90-4 of the maximum reverse stroke relay 90 (line 49). However, since these contacts remain open, the maximum reverse stroke relay 90 not being energized, the reverse jam relay 116 remains deenergized.

The normally closed contacts 98-1 (line 41) in series with the forward control relay 96 are closed thus enabling the circuit to that relay which remains deenergized because the normally closed contacts 100-1 of the reverse control relay 100 are open. The normally open contacts 98-4 (line 45) in series with the reverse control relay 100 open, but this relay remains energized due to the closed holding contacts 100-3 (line 44). Finally, the normally open holding contacts 98-5 which bypass the first or forward pressure switch 62 open to disable that bypass circuit.

When the reverse stroke timer clock 104C times out the normally closed timed contacts 104-2 in series with the reverse jam relay 116 open to preclude that relay from being energized when the maximum reverse stroke relay 90 (line 49) is energized at the end of the reverse stroke. If, on the other hand, the reverse stroke relay 90 is energized before reverse stroke timer clock 104C times out, a jam is indicated and the reverse jam relay 116 will be energized, as described in more detail below.

When the harpoon assembly 22 is fully retracted, and the piston is unable to move further, pressure in conduit 58 rises until it is sufficiently high to operate the reverse pressure switch 64 (line 49). When this switch closes, maximum reverse stroke relay 90 is energized.

The normally closed contacts 90-1 (line 4) open. However, this has no effect since the alarm delay relay 92 remains energized through its holding contacts 92-1 and the contactor 74 remains energized through its holding contacts 74-1 and the normally closed contacts 86-1 (line 3) of the alarm relay 86. The normally open contacts 90-5 (line 13) are closed to enable the pulse timing circuit to operate so that when the pulse timer 120 (line 14) closes its contacts 120-1 (line 13) the motion detector 74 is reset.

The normally closed contacts 90-2 (line 20) in series with the forward stroke timer 102 are opened to deenergize that circuit and to disable the forward jam relay 114 (line 24). The normally open contacts 90-4 (line 31) in series with the reverse jam relay 116 close, but since the reverse stroke timer 104 has already timed out to open its normally closed timed contacts 104-2, the reverse jam relay 116 is not energized.

The normally open contacts 90-6 (line 41) are closed to complete a circuit through the pulse timer 120 which after a short delay closes its normally open contacts 120-1 to pulse and reset the motion detector 94. Closure of contacts 90-6 (line 41) also energizes a dwell timer 122, including the dwell indicator 122I and dwell clock 122C. After a predetermined delay, dwell clock 122C closes normally open timed contacts 122-1 in series with the forward control relay 96 to energize that relay through the normally closed contacts 98-1 of the maximum forward stroke relay and the normally closed contacts 100-1 of the reverse control relay. The normally closed contacts 90-3 (line 44) open to deenergize the reverse control relay 100, and the normally open contacts 90-6 (line 48) in series with the normally closed contacts 96-5 of the forward control relay 96 close to bypass the reverse pressure switch 64 and maintain the maximum reverse stroke relay 90 energized even if by chance the pressure switch 64 should open prematurely.

When the reverse control relay 100 (line 44) is deenergized, its normally open contacts 100-2 (line 27) open to disable the reverse stroke timer 104 when contacts 98-2 are opened. When the reverse stroke timer is deenergized, the normally closed time contacts 104-2 (line 31) close, and the normally open contacts 104-1 (line 28) open to preclude the reverse jam relay 116 from being energized.

The reverse control relay holding contacts 100-3 (line 44) open to maintain reverse control relay 100 deenergized even after the maximum reverse stroke relay 90 (line 49) is deenergized allowing its normally closed contacts 90-3 (line 44) to close. The normally closed contacts 100-4 (line 46) close to enable the bypass circuit around the forward pressure switch 62 in series with the forward stroke relay 98 which does not energize since the pressure switch 62 is open as are the holding contacts 98-5 of the forward stroke relay.

Finally, the normally open contacts 100-5 (line 51) open to deenergize the reverse solenoid 60 allowing the control valve 50 to close. As a result, the pressure in line 58 drops and the pressure switch 64 opens. However, maximum reverse stroke relay 90 remains energized through its holding contacts 90-6 and the normally closed contacts 96-5 (line 48) of the forward control relay 96.

When the dwell timer 122 (lines 36–40) times out, its contacts 122-1 (line 40) close to energize the forward control relay 96. When the forward control relay 96 is energized, the forward stroke cycle is repeated as described above except that when the normally closed contacts 96-5 (line 48) of the forward control relay open the maximum reverse stroke relay 90 is deenergized.

As a result, the normally closed contacts 90-1 (line 4) close, the contacts 90-5 (line 13) open to allow the motion detector 94 to commence its timing, the normally closed contacts 90-2 (line 20) close to energize the forward stroke timer 102 through the now closed contacts 96-2 (line 20) of the forward control relay 96, the contacts 90-4 (line 31) open to further disable the reverse jam relay 116, the normally open contacts 90-6 (line 41) open to deenergize the interval timer and to deenergize the pulse timer 120 (line 14). However, in spite of the fact that the contacts 90-6 (line 41) open, the forward control relay 96 remains energized through the forward control holding contacts 96-3 (line 43).

The normally closed contacts 90-3 (line 44) close to enable the reverse control relay 100 which, however, remains deenergized due to the fact that the reverse control contacts 100-3 (line 44), the maximum forward stroke relay contacts 98-4 (line 45) and the forward control relay contacts 96-4 are all open. Finally, the normally open holding contacts 90-6 open to disable the bypass circuit around pressure switch 64. Thus, in the normal cycle, the increase in pressure at the end of each stroke causes deenergization of one of the solenoids 54 or 60 and energization of the other solenoid to effect continuing reciprocating movement of the harpoon assembly 22.

A jam is indicated if the forward pressure switch 62 is closed before the forward stroke timer 102 (lines 19–24) times out or if reverse pressure switch 64 is closed before reverse stroke timer 104 (lines 26–31) times out. If this occurs, the forward pressure switch 62 (line 47) closes to energize the maximum forward stroke relay 98 or reverse pressure switch 64 (line 49) closes to energize maximum reverse stroke relay 90. The contacts of these relays operate as described above.

However, in this case, when the contacts 98-3 (line 24) or 90-4 (line 31) close, a circuit is completed through the forward jam relay 114, or reverse jam relay 116. When the jam relay 114 or 116 is energized, its normally open contacts 114-1 (line 16) or 116-1 (line 17) close to enable the alarm relay 86 which is then energized if the delay contacts 124-1 (line 16) of the jam delay timer 124 (line 32) close. In addition, the normally open contacts 114-2 (line 33) or 116-2 (line 34) of the jam relays 114 or 116 close to energize the jam delay timer 124 through the normally closed delay contacts 126-1 (line 32) of the jam check timer 126 (line 18).

As indicated above, when the maximum forward stroke relay 98 (line 47) is energized, the forward control relay 96 is deenergized and the reverse control relay 100 is energized. As a result, as described above, pressure switch 62 opens, to deenergize forward stroke relay 98. The normally open contacts 98-3 (line 24) open to deenergize forward jam relay 114. When the jam delay timer 124 is energized, its holding contacts 124-2 (line 32) are closed to bypass the contacts 114-2, 116-2 of the jam relays 114, 116. The normally open contacts 124-3 (line 41) in parallel with the dwell timer contacts 122-1 close to bypass that timer and enable the forward control relay 96.

As indicated above, when the maximum forward stroke relay 98 (line 47) is energized, the forward control relay 96 is deenergized and the reverse control relay 100 is energized. As a result, again as described above, pressure switch 62 opens to deenergize maximum forward stroke relay 98. As a result, the normaly open contacts 98-3 (line 24) open to deenergize forward jam relay 114.

Contacts 114-1 (line 16) open to disable the circuit through alarm relay 86, and contacts 114-2 (line 33) open, but these contacts are bypassed by contacts 124-2 so the conveyor jam timer 124 remains energized.

Although the forward control relay 96 is deenergized, and its contacts 96-2 (line 20) open, the forward timer 102 remains energized through its contacts 102-1.

After a preselected time interval, the jam delay timer 124 (line 32) times out to close its normally open delay contacts 124-1 (line 16) and energize the jam check timer 126 (line 18). The alarm relay 86 is not energized because the forward jam relay 114 has been deenergized opening contacts 114-1. The normally closed delay contacts 126-1 (line 32) of the jam check timer 124 will open after an additional period of time to deenergize the conveyor jam delay timer 124 and open contacts 124-1 (line 16) to disable alarm relay 86 unless during that interval either the forward jam relay 114 or the reverse jam relay 116 is once again energized indicating that a jam still exists. If this occurs, contacts 114-1 (line 16) or 116-1 (line 17) close to complete a circuit through the alarm relay 86 and the still closed contacts 124-1 (line 16) of the jam delay timer 124. When this occurs, the alarm relay 86 is energized as is the alarm light 86 and horn 108 as described above. When the alarm relay 86 is energized, the normally closed contacts 86-1 (line 3) in series with the contact or coil 74 open to open main contactor contacts 74M and deenergize the pump motor 70 to deactivate the hydraulic pump 46. Normally open holding contacts 86-2 close to maintain the alarm relay 86 and associated alarm circuitry energized until the stop/reset button 84 is actuated. Finally, the normally closed contacts 86-3 (line 36) open to disable the circuitry associated with the forward and reverse control relays 96, 100, stroke relays 90, 98, and the forward and reverse solenoids 54, 60.

The reverse jam cycle is substantially the same as that described above except that it is triggered when the maximum reverse stroke relay 90 (line 49) is energized as a result of closure of the reverse pressure switch 64 before reverse stroke timer 104 has timed out.

The motion timer or motion detector 94 (lines 5–9), is a control circuit which must be pulsed periodically to be reset in order to preclude it from timing out. If the timer 94 times out, its normally closed delay contacts 94-1 close to energize the alarm relay 86 which functions as described above. The system is turned off and/or reset by actuating the normally closed stop reset push button 84 (line 3).

Thus, there has been disclosed a control system for a harpoon conveyor operating circuit which is responsive to increases in pressure in the hydraulic operating circuit to effect reciprocal operation of the harpoon assembly and is further able to detect the existence of jams, to attempt to automatically release the jams by effecting a reciprocal action of the harpoon assembly and, if the jam cannot be cleared, to inactivate the entire system and provide an alarm indication thereof. This system overcomes the unreliability of external sensors and switches which must be adjusted to specific positions of the harpoon and which must continuously be monitored and checked to insure that such external monitoring circuitry continues to operate as designed.

From the foregoing, it will be observed that numerous variations and modifications may be effected without departing from the true spirit and scope of the novel concept of the invention. It is, of course, intended to cover by the appended claims all such modifications as fall within the scope of the claims.

We claim:

1. A control system for a harpoon-type conveyor for the transportation of swarf-like material, said conveyor being of the type including a conveyor trough having an upstream end and a downstream end, harpoon means in said trough adapted to be reciprocably moved in a forward direction from an upstream position toward a downstream position and in a rearward direction from a downstream position towards an upstream position while urging the swarf-like material downstream along said trough, and a pressurized fluid circuit for effecting said reciprocating movement of said harpoon means including fluid motor means coupled to said harpoon means and selectively operable to effect said reciprocating movement thereof, a source of pressurized fluid and valve means actuatable to selectively couple pressurized fluid in said fluid circuit to said fluid motor means to effect said selective operation thereof and said resulting reciprocating movement of said harpoon means; in which the pressure of said fluid increases in response to stoppage of movement of said harpoon means in one of said directions while said valve means is actuated to effect movement of said harpoon means in said one direction; said control system comprising:
 valve control means selectively energizable to actuate said valve means to effect movement of said harpoon means by selectively coupling said pressurized fluid to said fluid motor means;
 pressure sensitive means for sensing the fluid pressure in a portion of said fluid circuit and operable in response to a selected value of increased fluid pressure therein;
 means responsive to operation of said pressure sensitive means for deenergizing said valve control means to thereby deactuate said valve means and terminate the operation of said fluid motor means to move said harpoon means in said one direction;
 additional means responsive to operation of said pressure sensitive means for energizing said valve control means to effect movement of said harpoon means in the other of said directions;
 timing means energized concurrently with energization of said valve control means for defining a normal operating time period of selected duration; and
 means energized in response to operation of said pressure sensitive means prior to the expiration of said normal operating time period for initiating a jam cycle to effect unjamming of said harpoon means.

2. A control system as claimed in claim 1 wherein:
 said jam cycle control means includes additional timing means energized in response to energization of said jam cycle control means for defining a jam cycle time period; and
 said control system includes alarm means energizable in response to subsequent energization of said jam cycle control means during a selected portion of said jam cycle time period.

3. A control system as claimed in claim 1 including:
 means responsive to energization of said alarm means for disabling operation of said harpoon-type conveyor.

4. A control system as claimed in claim 2 wherein:
 said jam cycle control means includes means for terminating said jam cycle in response to the expiration of said jam cycle time period.

5. A control system as claimed in claim 1 wherein said timing means includes:
 forward timing means energized concurrently with energization of said valve control means to effect movement of said harpoon means in a forward direction for defining a forward normal operating time period of selected duration; and
 rearward timing means energized concurrently with energization of said valve control means to effect movement of said harpoon means in a rearward direction for defining a rearward normal operating time period of selected duration.

6. A control system as claimed in claim 5 including:
 means responsive to operation of said pressure sensitive means when said valve control means is energized to effect movement of said harpoon means in a forward direction for resetting said rearward timing means;
 whereby said rearward timing means defines a normal operating time period when subsequently energized; and
 means responsive to operation of said pressure sensitive means when said valve control means is energized to effect movement of said harpoon means in a rearward direction for resetting said forward timing means;
 whereby said forward timing means defines a normal operating time period when subsequently energized.

7. A control system as claimed in claim 5 including:
 dwell timing means energized in response to operation of said pressure sensitive means subsequent to expiration of said rearward normal operating time period for inhibiting for a selectable dwell period energization of said valve control means to effect movement of said harpoon means in a forward direction.

8. A control system as claimed in claim 7 including means responsive to operation of said pressure sensitive means prior to expiration of said normal rearward operating time period for permitting energization of said valve control means prior to expiration of said dwell period.

9. A control system for a harpoon-type conveyor for the transportation of swarf-like material, said conveyor being of the type including a conveyor trough having an upstream end and a downward end, harpoon means in said trough adapted to be reciprocably moved in a forward direction from an upstream position toward a downstream position and in a rearward direction from a downstream position towards an upstream position while urging the swarf-like material downstream along said trough, and a pressurized fluid circuit for effecting said reciprocating movement of said harpoon means including fluid motor means coupled to said harpoon means and selectively operable to effect said reciprocating movement thereof, a source of pressurized fluid and valve means actuatable to selectively couple pressurized fluid in said fluid circuit to said fluid motor means to effect said selective operation thereof and said resulting reciprocating movement of said harpoon means, said valve means being a solenoid operated valve having a forward operating position for operating said fluid motor means to effect movement of said harpoon means in a forward direction and a rearward operating position for effecting operation of said fluid motor means to move said harpoon means in a rearward direction; in which the pressure of said fluid increases in response to stoppage of movement of said harpoon means in one of said directions while said valve means is actuated to effect movement of said harpoon means in said one direction; said control system comprising:

valve control means selectively energizable to actuate said valve means to effect movement of said harpoon means by selectively coupling said pressurized fluid to said fluid motor means;

said valve control means comprising a forward solenoid for effecting operation of said valve to its forward position and a rearward solenoid for effecting operation of said valve to its rearward position;

pressure sensitive means for sensing the fluid pressure in a portion of said fluid circuit and operable in response to a selected value of increased fluid pressure therein;

said pressure sensitive means including forward pressure sensitive switch means for sensing increases in said fluid pressure when said valve means is operated to effect movement of said harpoon means in a forward direction, and reverse pressure sensitive switch means for sensing pressure in said fluid circuit when said valve means is operated to effect movement of said harpoon means in a rearward direction;

means responsive to operation of said pressure sensitive means for deenergizing said valve control means to thereby deactuate said valve means and terminate the operation of said fluid motor means to move said harpoon means in said one direction;

first solenoid control means energizable to effect energization of said forward solenoid; second solenoid control means energizable to effect energization of said rearward solenoid;

said means responsive to operation of said pressure sensitive means including first circuit means energized in response to actuation of said forward pressure switch for deenergizing said forward solenoid control means, and second circuit means energized in response to actuation of said rearward pressure switch for deenergizing said reverse solenoid control means;

said first circuit means when energized effecting energization of said reverse solenoid control means, and said second circuit means when energized effecting energization of said forward solenoid control means;

forward timing means energized concurrently with energization of said forward solenoid control means for defining a normal forward operating time period of selected duration; and rearward timing means energized concurrently with energization of said second solenoid control means for defining a normal rearward operating time period of selected duration.

10. A control system as claimed in claim 9 including:

means energized in response to energization of said first circuit means prior to expiration of said forward normal operating time period for initiating a forward jam cycle to effect unjamming of said harpoon means; and means energized in response to operation of said second circuit means prior to expiration of said rearward time period for initiating a rearward jam cycle to effect unjamming of said harpoon means.

11. A control system as claimed in claim 10 including:

jam timing means energized in response to energization of either of said jam cycle control means for defining a jam cycle time period; and alarm means energized in response to energization of either of said jam cycle control means prior to the expiration of said jam time period for terminating operation of said harpoon-type conveyor.

12. A control system as claimed in claim 11 wherein:

said jam timing means includes first a jam timer energized in response to energization of either of said jam cycle control means for defining a jam clear period during which subsequent energization of said jam cycle control means is ineffective to energize said alarm means, and second timing means defining a jam check period subsequent to said jam clear period during which energization of said jam cycle control means is effective to energize said alarm means.

* * * * *